April 19, 1949.     C. M. WOODRUFF     2,467,415
PULSE GENERATOR
Filed Jan. 2, 1945

INVENTOR.
CLARENCE M. WOODRUFF
BY
William D. Hall.
ATTORNEY

Patented Apr. 19, 1949

2,467,415

UNITED STATES PATENT OFFICE 2,467,415

PULSE GENERATOR

Clarence M. Woodruff, Dayton, Ohio

Application January 2, 1945, Serial No. 571,056

1 Claim. (Cl. 250—36)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to radar and more particularly to a generator of pulses of extremely narrow width and rectangular wave form.

The objects of the present invention comprise the provision of a pulse generator using the triggered discharge of two gas-filled electronic tubes in tandem for radar and related purposes, capable of generating in a simple improved manner an extremely narrow pulse of very proximately rectangular wave form; a pulse generator yielding a pulse of high voltage and of either positive or negative sign; a pulse generator using two triggered gas-filled electronic tubes in resistance capacity oscillatory circuits; and a pulse generator in which the pulse width and pulse repetition rate are separately controllable and which possesses other advantages, as appear hereinafter.

Figure 1:
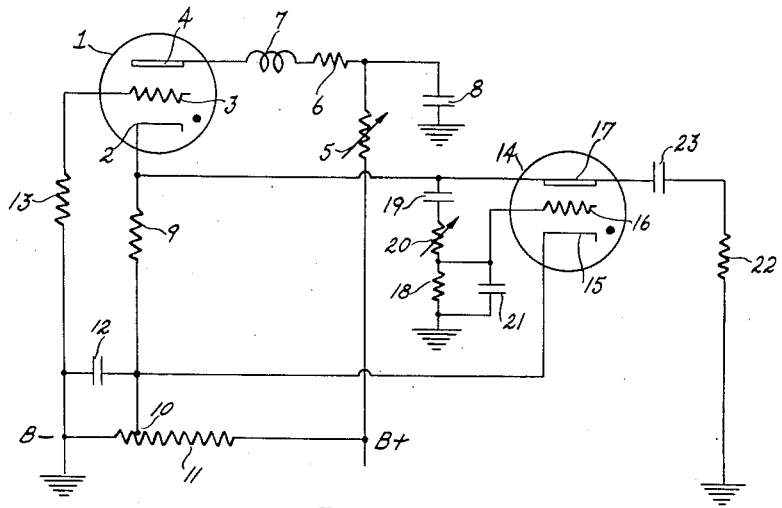
Figure 2:
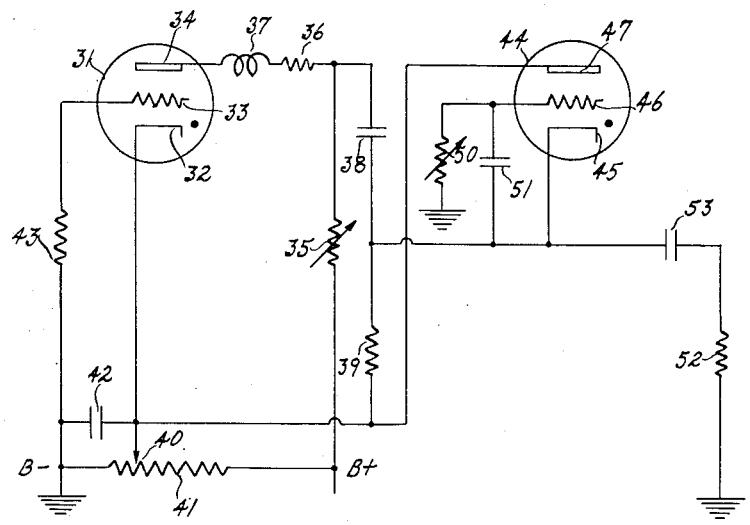

With the above and other objects in view which will be apparent to those who are informed in the field of radio from the following description, suitable illustrative embodiments of the present invention are shown in the accompanying drawing wherein:

Fig. 1 is a schematic circuit of a generator for generating repeated pulses of positive voltage; and Fig. 2 is a schematic circuit of a generator for generating repeated pulses of negative voltage.

In the circuit that is shown in Fig. 1, a gas triode 1 comprises a cathode 2, grid 3 and plate 4. Plate supply voltage for the triode 1 is supplied from the positive terminal B+ through a variable time-constant resistor 5, current limiting resistor 6, and choke 7, to the plate 4 of the triode 1. A time-constant capacitor 8 is connected in series with the time constant resistor 5, between B+ and ground. The negative terminal of the plate voltage supply for the triode 1 is grounded at B—. The grid 3 of the triode 1 is grounded through a grid resistor 13. The cathode 2 of the triode 1 is connected through a cathode resistor 9 to a tap 10 on a potentiometer 11 which is thrown across the plate voltage supply of the triode 1. By-pass capacitor 12 is placed between tap 10 and ground.

A second gas triode 14 in the present circuit comprises a cathode 15, a grid 16, and a plate 17. The cathode 15 is connected directly to the tap 10 of the potentiometer 11 and the plate 17 is connected directly to the cathode 2 of the triode 1.

The grid 16 is grounded through a grid leak resistor 18 and a time-constant capacitor 21 in parallel. The grid 16 also is connected to the plate 17 through a variable time-constant resistor 20 and a capacitor 19 in series. A load resistor 22 is connected between the plate 17 and ground through a blocking capacitor 23 at its plate end.

Two relaxation oscillator circuits are provided, one comprising the gas triode 1, the resistor 5 and the capacitor 8, and the other comprising the gas triode 14, the resistor 20 and the capacitor 21.

In operation of the circuit assuming that the cycle of operation commences with the capacitor 8 discharged, the tube 1 non-conducting, and the plate 4 at ground potential, charging current from plate voltage supply at B+ flows through the resistor 5 into the capacitor 8. As the capacitor 8 charges, the potential of the plate 4 rises until the striking voltage of the gas tube 1 is reached. At this point the arc in the tube 1 strikes and current flows through the tube 1 and through the cathode resistor 9 and a part of the potentiometer 11 and back to ground.

Due to the nature of the gas triode 1, the voltage drop thereacross falls to about 15 volts and the cathode 2 attains a positive potential above ground, which is the difference between the striking voltage and 15 volts. The voltage difference simultaneously appears across the cathode 15 and the plate 17 of the gas triode 14 and also across the network comprising the resistors 18 and 20 and the capacitors 19 and 21. Initially, the grid 16 of the gas triode 14, which is also a part of this network, is at ground potential. When the gas triode 1 strikes, transitory current flows through the capacitor 19 and the resistor 20 in series with the combination of the resistor 18 and the capacitor 21 in parallel. The capacitor 19 is fairly large so that a considerable charging current flows and the voltage across the capacitor 21 and also the potential of the grid 16, rise quite rapidly.

Initially, the difference between the grid 16 and the cathode 15 of the gas triode 14 is the same as that existing between the grid 3 and the cathode 2 of the gas triode 1. The voltage that is applied to the gas triode 14 when the gas triode 1 breaks down, is less than the breakdown voltage of the gas triode 14. Due to the rise of potential of the grid 16 above ground by the process which has been presented, the negative bias of the grid 16 with respect to the cathode 15 grows less and less and eventually reaches a value which causes the gas triode 14 to break down and initiate discharge. When this takes place there will be a circuit of very low impedance from the high voltage side of the capacitor 8 through the gas triode 1, the gas triode 14, and the capacitor 12 back to the low voltage side of the capacitor 8. The capacitor is therefore discharged in a very short time. The plate voltages of the gas triodes 1 and 14 will quickly fall to the cut-off values, the arcs are quenched, and the tubes become again non-conducting. The time-constant capacitor 8 will be substantially discharged and the circuit returns to the initial condition from which it started, and the cycle repeats.

It will be observed that the voltage across the load resistor 22 follows the short time fluctuations of the plate 17, due to the connection through the capacitor 23. Hence upon the striking of the gas triode 1, there is an upward surge of voltage across the load resistor 22 and upon striking of the gas triode 14 there is an equal downward surge across it. This surge constitutes the generated pulse. The duration of this pulse is substantially the time required to charge the capacitor 21 through the resistor 20, and the time-constant of these two elements may be taken as the pulse length.

The interval between pulses is the time required to charge the capacitor 8 through the resistor 5 so that the time-constant of these two elements may be taken as the pulse repetition interval. It will be noted that, since both the start and the finish of the pulses are caused by the breakdown of the gas triodes 1 and 14, both sides of the pulses are very steep; and, since voltage conditions across the load resistor are very steady between the striking of the gas triode 1 and the striking of the gas triode 14, the top of the pulse is reasonably level. A pulse signal is obtained thereby which approaches very closely to the ideal rectangular wave form without trailing edges on either side and of a duration which may be made very short indeed.

The voltage output of the pulse is extremely high since it is substantially the breakdown voltage of the gas triode 14. The purpose of the capacitor 12, which is made quite large, is to furnish a by-pass to ground for alternating currents, and thus maintain the cathode 15 at a fixed potential. The grid resistor 13 prevents undue grid current in the gas triode 1. The resistor 18 furnishes a discharge path for the capacitor 21 and, together with the resistor 20, determines the proportionate rise of voltage of the grid 16. The resistor 6 is inserted in series with the plate 4 to limit the discharge current in the gas triode 1 and 14 to safe values. The inductor 7, having very small inductance, has been found helpful in suppressing parasitic oscillations in the gas triode 1. The capacitor 23 serves to isolate the circuit of the pulse generator from the circuit of the load 22 insofar as direct currents are concerned. By varying the resistor 20 the pulse width may be varied without altering any other characteristic of the discharge. By varying the resistor 5, the pulse repetition rate may be controlled without altering any other characteristic of the discharge.

A second form of device that also embodies the present invention is disclosed in Fig. 2. The circuit that is disclosed therein differs from that of Fig. 1 in that it is modified to produce a negative pulse rather than a positive one. The circuit that is shown in Fig. 2 comprises a gas triode 31 that comprises a cathode 32, a grid 33, and a plate 34. Positive plate voltage is supplied at terminal B+ through a variable time-constant resistor 35, a limiting resistor 36, and a choke 37, to the plate 34. The negative terminal B— of the plate voltage supply for the triode 31, not shown, is grounded. A potentiometer resistor 41 is connected across the plate voltage supply. The cathode 32 of the gas triode 31, is connected to a tap 40 of a potentiometer 41 and is by-passed to ground through a by-pass capacitor 42. The grid 33 is grounded through a limiting resistor 43. A cathode resistor 39, a time-constant capacitor 38, a limiting resistor 36, and a choke 37 are connected in series in the order named between the cathode 32 and the plate 34.

The plate 47 of a second gas triode 44 is connected directly to the cathode of the gas triode 31. The cathode 45 of the gas triode 44 is connected to the junction of the time-constant capacitor 38 and the cathode resistor 39. The grid 46 of the gas triode 44 is grounded thru a variable time-constant resistor 50 and is connected to the cathode 45 through a time-constant capacitor 51. The cathode 45 is connected through a blocking capacitor 53 to one terminal of a load resistor 52, the other terminal of which is grounded for a return circuit.

The cycle of operation of the pulse generator that is shown in Fig. 2 starts with the time-constant capacitor 38 uncharged, the gas triode 31 non-conducting, and the plate 34 only slightly above ground. Current flows from the terminal B+ through the circuit comprising the time-constant resistor 35, the time-constant capacitor 38, the cathode resistor 39, and the potentiometer tap 40 to the terminal B—. This builds a charge on the time-constant capacitor 38, and the voltage of the plate 34 rises to the striking voltage of the gas triode 31. At the instant of the arc striking in the gas triode 31, the voltage across the plate 34 and the cathode 32 falls to about 15 volts due to the nature of the gas tube 31. Operation of gas triode 31 is analogous to that of gas triode 1 shown in Fig. 1. Capacitor 38 is charged to a high potential difference and then discharges through the limiting resistor 36, the choke 37, the gas triode 31, and the resistor 39.

The principal part of the voltage drop in this circuit external to the capacitor 38 is located across the cathode resistor 39. Since the cathode 32, to which one end of the cathode resistor 39 is connected, is held closely to ground, the other end of the cathode resistor 39, which is connected to the capacitor 38, becomes strongly negative below ground. The cathode 45 of the gas triode 44 is connected to this same end of the cathode resistor 39 and also swings strongly negative. The whole voltage drop across the capacitor 38 appears across the plate 47 and the cathode 45 of the gas triode 44, but it is not sufficient to cause gas triode 44 to break down while restrained by the negative grid bias initially between grid 46 and cathode 45.

At the inception of the cycle, the bias of the grid 46, with respect to the cathode 45, is the same as that of the grid 33 with respect to the cathode 32 and appears across the time-constant capacitor 51. When, at the breakdown of the gas triode 31 the cathode 45 swings negative, the grid 46 is constrained to follow, since the voltage across the capacitor 51 can only change with time. The bias of the grid 46 is therefore the same as before, and, since the voltage across the cathode 45 and the plate 47 is too low to cause breakdown at this bias, the grid 46 being negative, current flows in from ground through the time-constant resistor 50. The time-constant capacitor 51 then charges and the voltage of grid 46 rises. Ultimately the voltage rises to a point at which the gas triode 44 breaks down. This breakdown closes a low impedance path for the discharge of the time-constant capacitor 38 through the limiting resistor 36, the choke 37, the gas triode 31 and the gas triode 44.

At the instant the gas triode 44 breaks down, voltage across the plate 47 and the cathode 45 falls to about 15 volts, and, since the plate 47 is held near ground by the potentiometer 40 and by the capacitor 42, the voltage of the cathode 45 swings back up to its normal value. The time-constant capacitor 38 is discharged very quickly. The arcs in the gas triodes 31 and 44 are quenched for want of the plate voltage, and the circuit returns to its initial state to repeat the cycle.

At the instant that the gas triode 31 breaks down, the voltage across the load resistor 52 swings strongly negative. At the instant that the gas triode 44 breaks down the voltage swings up again. This is by reason of the connection of the ungrounded terminal of load resistor 52 to the cathode 45 through the blocking capacitor 53. The negative pulse, which the second form of the device is designed to produce is generated in this manner.

The pulse width is determined by the time-constant of the resistor-capacitor combination 50—51 and may be varied by the varying resistor 50 without affecting other characteristics of the generated pulse. The pulse repetition interval is determined by the time-constant of the resistor-capacitor combination 35—38, and may be varied by varying the resistor 35 without varying other characteristics of the generated pulse.

The function of the subsidiary components is substantially analogous to that of the similar and similarly designated components in Fig. 1.

In specific embodiments of the circuits that are shown in Figs. 1 and 2 the following values for the several components have been found to operate satisfactorily:

| Components | Values |
| --- | --- |
| 5, 35 | 1 Megohm. |
| 6, 36 | 1,000 Ohm. |
| 9, 39 | 50,000 Ohm. |
| 13, 43 | 50,000 Ohm. |
| 18 | 500,000 Ohm. |
| 20, 50 | 200,000 Ohm. |
| 8, 38 | 2,000 mmf. |
| 12, 42 | 1 mf. |
| 19 | .01 mf. |
| 21, 51 | 350 mmf. |

Tubes No. 884 were used for the gas triodes 1, 14, 31, and 44. The plate voltage supply was 300 volts. The bias voltage between cathodes 2, 15, 32, 45, and grids 3, 16, 33, 46 was about −4 volts. The width of the pulse produced was of the order of 1 microsecond, and the pulse repetition rate was of the order of 500 cycles per second.

It is to be understood that the circuits and the components, their values and the connections that are shown herein have been submitted for the purposes of illustrating and describing suitably operating embodiments of the present invention and that modifications, substitutions, and changes that result in suitably operating devices may be made therein without departing from the scope of the present invention.

What I claim is:

A self-actuated generator of electric pulses of extremely short time duration comprising first and second gas tubes, each having at least an anode, a cathode and a grid, the cathode of said first gas tube being connected to the anode of said second gas tube, means for periodically effecting electric discharges through said first gas tube comprising a condenser connected across said first tube, a source of direct current potential and a resistor connected between said source of potential and said condenser, means whereby the electric discharge through said first gas tube discharges said second gas tube after a predetermined time interval, said means comprising a resistor in series with said first gas tube whereby a potential is developed across said resistor when said first tube discharges, said potential being connected to the cathode of said second gas tube, said potential also being connected to the grid of said second tube through a time constant circuit whereby the potential difference between said grid and cathode will decrease at a predetermined rate causing said second tube to discharge, thereby causing the cessation of discharge through said first and second tubes.

CLARENCE M. WOODRUFF.

REFERENCES CITED

The following references are of record in the file of this patent:

UNITED STATES PATENTS

| Number | Name | Date |
| --- | --- | --- |
| 2,231,591 | Pieplow | Feb. 11, 1941 |
| 2,250,819 | Wolf | July 29, 1941 |
| 2,292,100 | Bliss | Aug. 4, 1942 |

FOREIGN PATENTS

| Number | Country | Date |
| --- | --- | --- |
| 487,982 | Great Britain | June 29, 1938 |
| 491,741 | Great Britain | Sept. 8, 1938 |